(12) United States Patent
Deeds

(10) Patent No.: US 7,120,471 B2
(45) Date of Patent: Oct. 10, 2006

(54) USER INTERFACE AND ASSOCIATED METHOD FOR INDICATING STATUS USING KEYPAD BACKLIGHTS

(75) Inventor: Douglas Deeds, Bedford, TX (US)

(73) Assignee: Nokia Corporation, Espoo (FI)

( * ) Notice: Subject to any disclaimer, the term of this patent is extended or adjusted under 35 U.S.C. 154(b) by 156 days.

(21) Appl. No.: 10/377,409

(22) Filed: Feb. 28, 2003

(65) Prior Publication Data

US 2004/0171410 A1    Sep. 2, 2004

(51) Int. Cl.
*H04B 1/38* (2006.01)
*H04M 1/00* (2006.01)

(52) U.S. Cl. .................. 455/566; 455/567; 455/574; 455/575.1; 455/90.3; 379/368; 379/433.06; 379/433.07; 345/168; 345/169; 345/170

(58) Field of Classification Search ........ 455/566–567, 455/575.1, 90.1–90.3, 565, 412.1–2, 414.1, 455/415, 418, 550.1, 154.1, 157.1–2, 158.4–5, 455/159.1; 379/433.01–433.07, 368; 345/168–170; 200/5 A
See application file for complete search history.

(56) References Cited

U.S. PATENT DOCUMENTS 6,674,854 B1 * 1/2004 Kawano et al. ............ 379/368
6,725,064 B1 * 4/2004 Wakamatsu et al. ........ 455/566
6,915,143 B1 * 7/2005 Kashu et al. ............... 455/560
2001/0034251 A1 * 10/2001 Goto .......................... 455/566
2002/0025829 A1 * 2/2002 Kitatani ...................... 455/550
2002/0183098 A1 * 12/2002 Lee et al. ................... 455/566
2003/0060240 A1 * 3/2003 Graham et al. ............. 455/566
2003/0073467 A1 * 4/2003 Tanaka et al. .............. 455/567
2004/0137966 A1 * 7/2004 Kawano et al. .......... 455/575.1

FOREIGN PATENT DOCUMENTS

| JP | 08079339 | * | 3/1996 |
| JP | 2000174896 | * | 6/2000 |
| JP | 02000278750 | * | 10/2000 |
| JP | 2002094638 | * | 3/2002 |
| WO | WO 96/27974 | * | 9/1996 |

* cited by examiner

*Primary Examiner*—Matthew D. Anderson
*Assistant Examiner*—Tuan Tran
(74) *Attorney, Agent, or Firm*—Banner & Witcoff, Ltd.

(57) ABSTRACT

A method for indicating status on a programmed communication device wherein each of one or more backlights is associated with a respective key of a plurality of keys. Status information to be communicated to a user of the communication device is then generated, and one or more backlights are illuminated according to a pattern corresponding to the status information. Thus, a visual graphical display is not necessary, cost is reduced, volume is conserved, and reliability is increased.

2 Claims, 9 Drawing Sheets

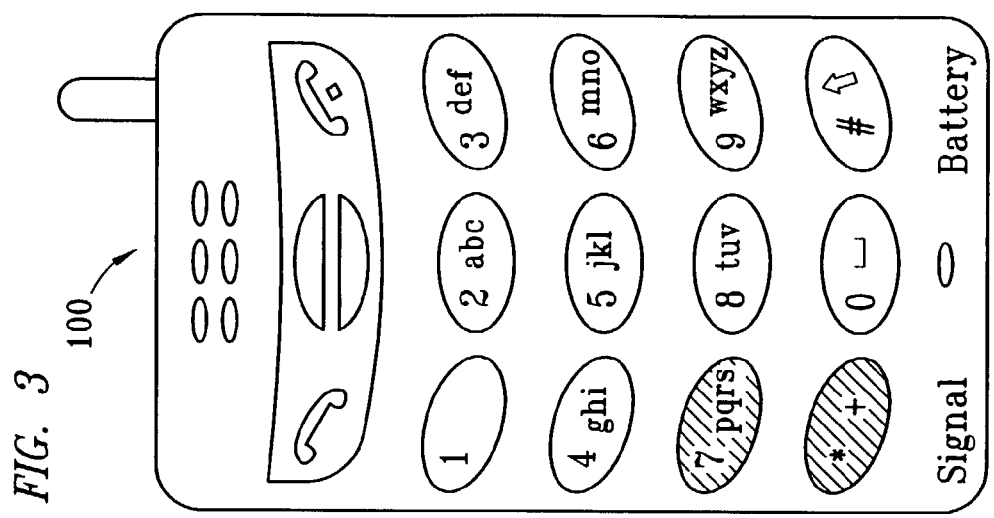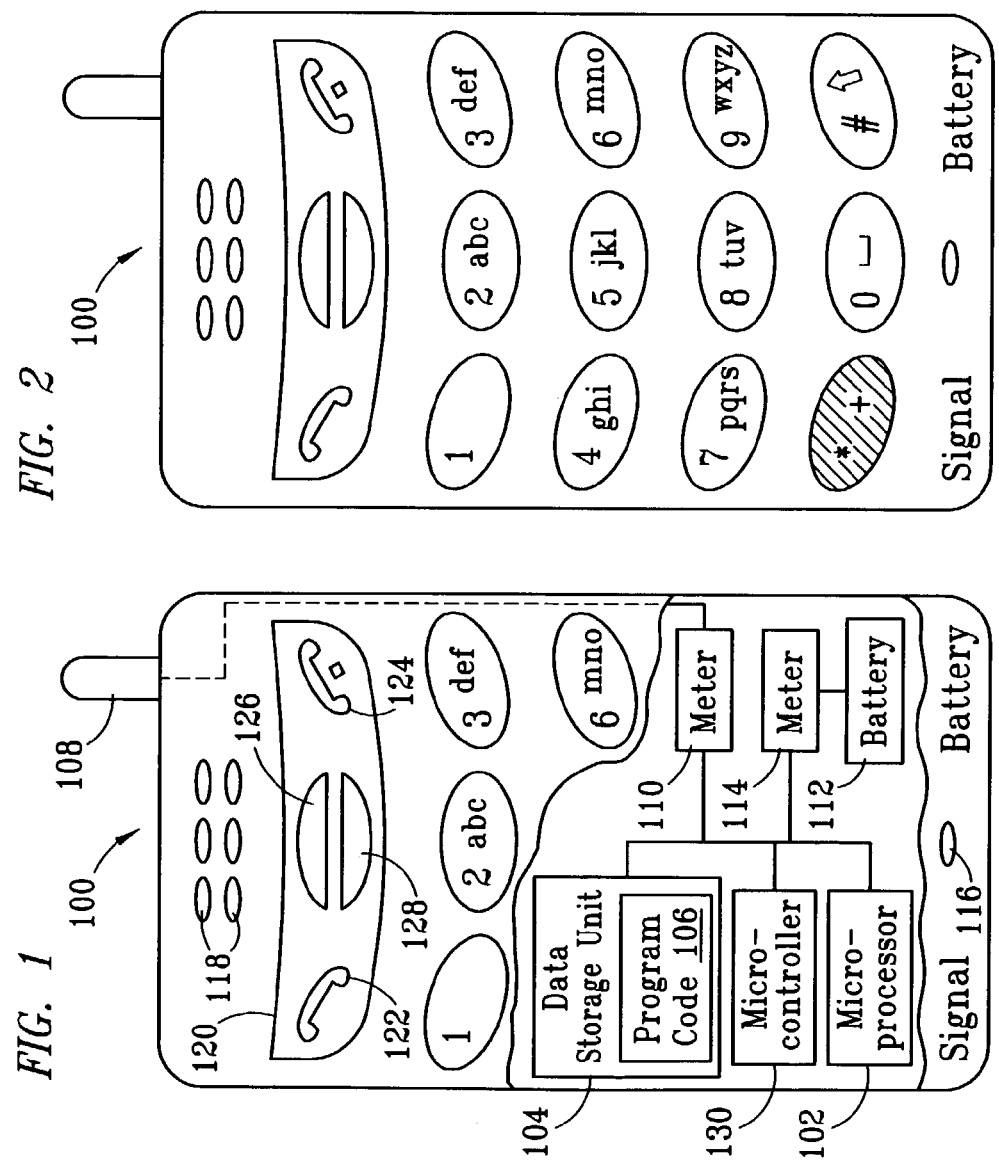

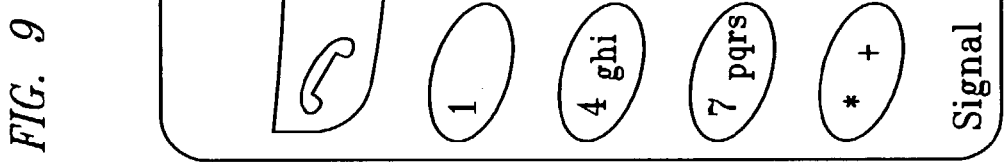
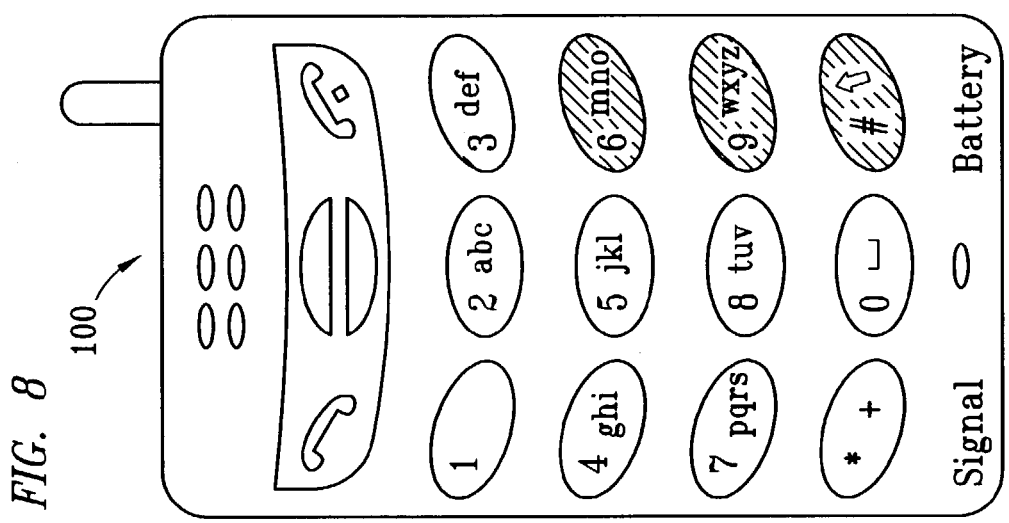
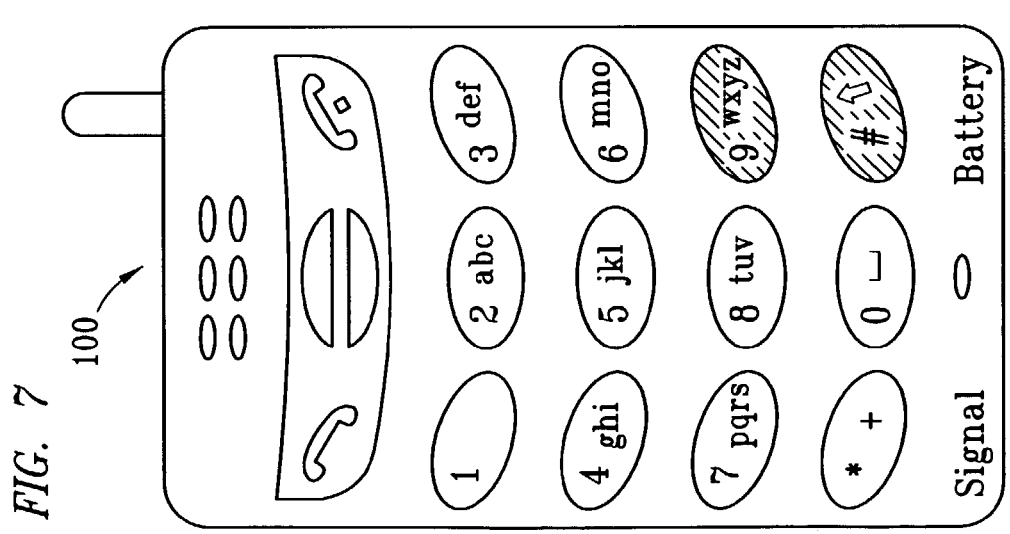

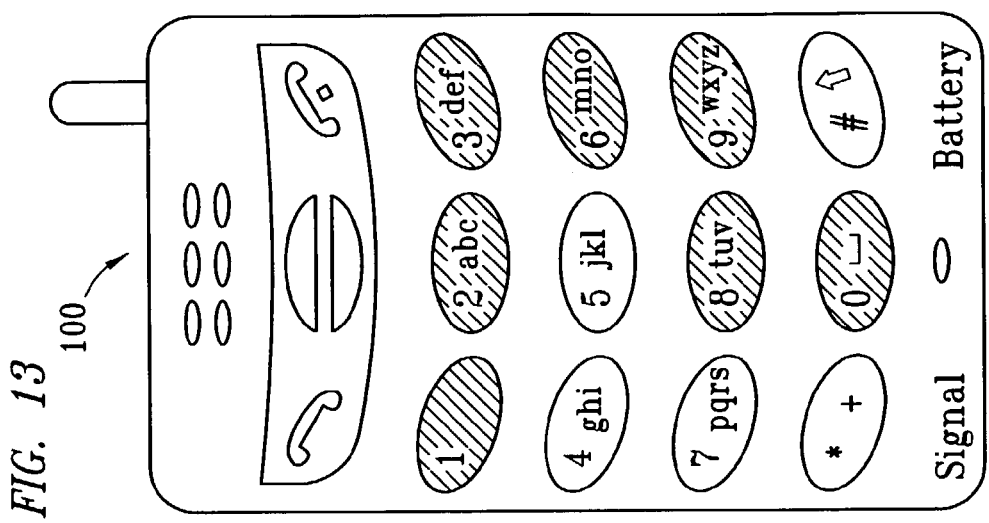
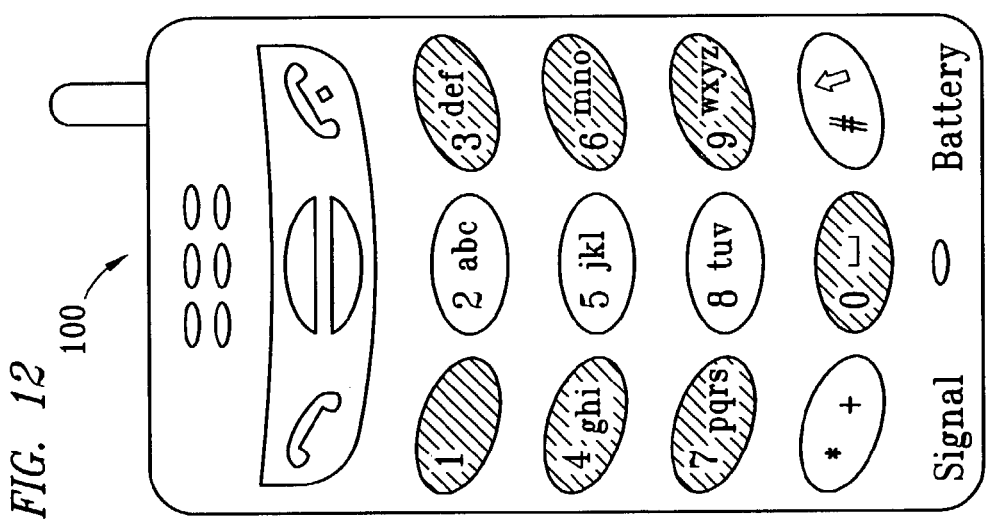
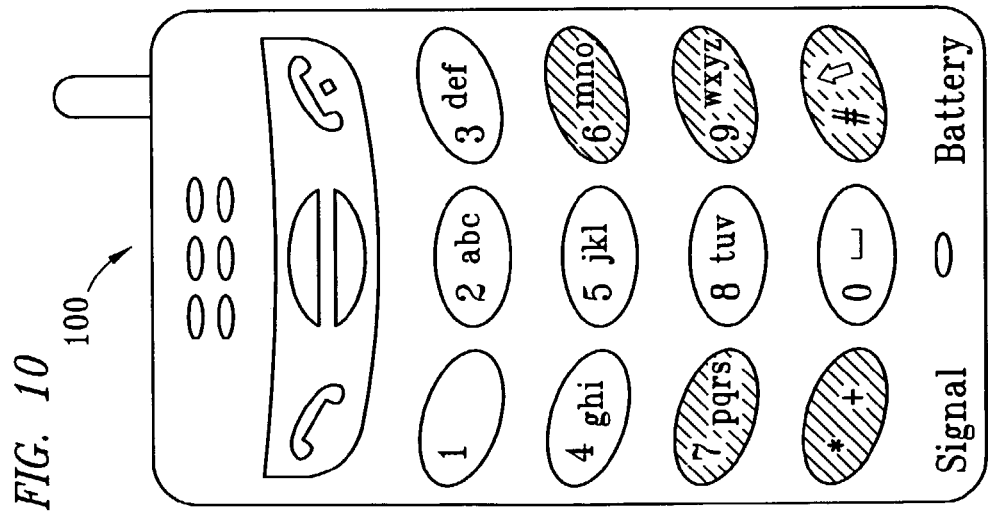

USER INTERFACE AND ASSOCIATED METHOD FOR INDICATING STATUS USING KEYPAD BACKLIGHTS

TECHNICAL FIELD

The invention relates generally to user output interfaces and, more particularly, to an apparatus and associated method for displaying the status of a communication device using the backlights of a keypad.

BACKGROUND

It is important that communication devices, such as cell phones, mobile telephone handsets, and the like, referred to herein as mobile telephones, be able to provide a user with relevant information about the operation of the mobile telephone, such as signal strength, remaining battery power, a dialed phone number, the phone number of an incoming call, and the like. Conventionally, such information has been provided via a visual graphical display, such as a liquid crystal display (LCD), light emitting diodes (LEDs), EL (electro-luminance).

There, however, are number of drawbacks associated with using such visual graphical displays. For example, visual graphical displays are costly, thereby potentially precluding many people from being able to own a mobile telephone. A continuing effort is also being made to make mobile telephones as volumetrically efficient as possible. It can readily be appreciated, however, that a visual graphical display will inherently limit the volumetric efficiency of a mobile telephone. To compensate for the additional volume required by a visual graphical display, the visual graphical display and/or keypad may be reduced in size, thereby rendering such display difficult to read, or such keypad difficult to use. Visual graphical displays also consume substantial battery power, a precious commodity for a mobile telephone. Still further, visual graphical displays are also prone to breakage, and a mobile telephone that relies on a visual graphical display is virtually worthless if its display is broken.

In an attempt to overcome the drawbacks associated with visual graphical displays, some mobile telephones are provided with dedicated indicators, which indicate the status of a single item, such as battery level or signal strength, without a visual graphical display. Such dedicated indicators, however, are generally limited to indicating only two states of an item, such as whether a battery level is below or above some predefined level. Furthermore, dedicated indicators also require volume, thereby imposing an additional limitation on how small a mobile telephone may be made.

Accordingly, a continuing search has been directed to the development of apparatuses and methods by which a mobile telephone may communicate information to a user in a manner which is relatively inexpensive, and which consumes less battery power and volume than conventional visual displays, and which is also less prone to breakage (i.e., more reliable) than conventional visual displays.

SUMMARY

The present invention, accordingly, provides for a communication device, such as a cell phone, wherein status on a programmed communication device is indicated using backlights associated with a respective key of a plurality of keys. Status information to be communicated to a user of the communication device is then generated, and one or more backlights are illuminated according to a pattern corresponding to the status information.

In a corresponding apparatus, a plurality of keys are operably integrated into the communication device, and each of a plurality of backlights is associated with a respective key of the plurality of keys. A microprocessor is operatively connected for illuminating one or more backlights, and a data storage unit is operatively connected to the microprocessor for storing program code executable by the microprocessor for illuminating one or more backlights according to a pattern corresponding to status information to be communicated to a user of the communication device.

It can be appreciated that the present invention renders a visual graphical display unnecessary, thereby reducing cost, conserving volume and battery charge, and increasing reliability of a communication device.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 shows a partially broken-away view of a representative communication device embodying features of the present invention;

FIGS. 2–10 show the communication device of FIG. 1 indicating various states of status;

FIGS. 12–22 show the communication device of FIG. 1 indicating various states of status.

DETAILED DESCRIPTION

Figure 4:
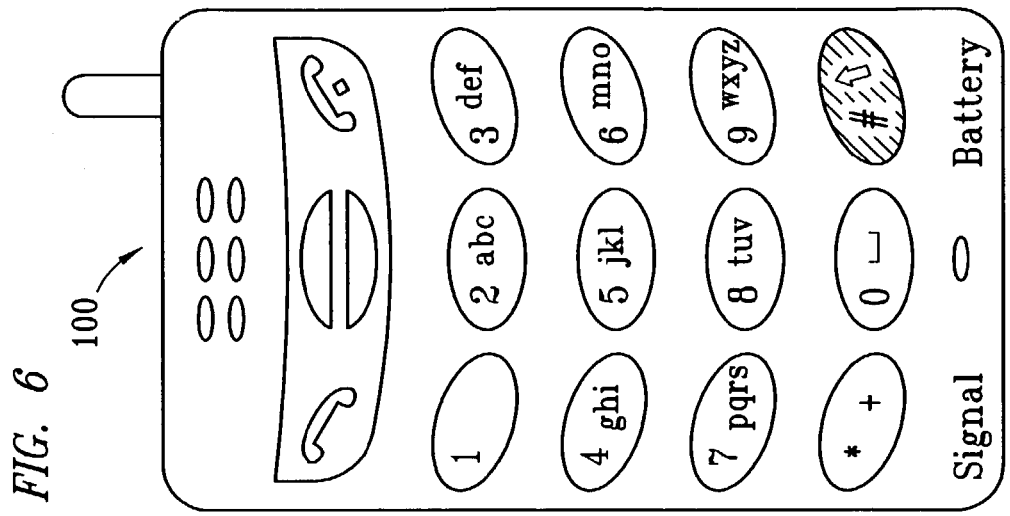

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning communication devices (e.g., mobile telephones), keypad backlights, and the like, have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Referring to FIG. 1 of the drawings, the reference numeral 100 generally designates a communication device embodying features of the present invention. The communication device 100 may constitute a cellular mobile telephone, a communicator, a multimedia phone, a personal digital assistant (PDA), a combination thereof, or the like. The communication device 100, furthermore, includes conventional features such as a processor, referred to herein as a microprocessor, 102 and a data storage unit 104 operatively connected to the microprocessor 102. The data storage unit 104 includes program code 106 for providing logic for operation of the microprocessor 102. An antenna 108 is connected to the microprocessor 102 for receiving radio frequency communications transmitted to the communication device 100, and passing such received communications to the microprocessor 102. A signal strength sensor 110 is connected to the antenna 108 for measuring the signal strength of the radio frequency communications received on the antenna 108 for generating a signal to the microprocessor 102 indicative of the such signal strength. A battery 112 is connected (in a conventional manner, not shown) within the communication device 100 for supplying electrical power to operate the communication device 100. A battery charge sensor 114 is connected to the battery 112 for measuring the charge of the battery 112 and generating to the microprocessor 102 a signal indicative of the strength of the battery charge. The communication device 100 also includes user interface features connected to the microprocessor 102, such as 1, 2, 3, 4, 5, 6, 7, 8, 9, 0, *, and # keys, a microphone 116, a speaker 118, and special purpose keys 120, such as a Talk key 122, an End key 124, scroll keys 126, and the like. Preferably, the communication device 100 is not provided with a visual graphical display, though one may be provided, as described in further detail with respect to FIG. 23. The aforementioned features of the communication device 100 are considered to be well known to those skilled in the art and, therefore, will not be described in further detail herein, except insofar as deemed necessary to describe the present invention.

In accordance with the present invention, each of the 1, 2, 3, 4, 5, 6, 7, 8, 9, 0, *, and # keys, the Talk key 122, the End key 124, and the scroll keys 126 and 128 are preferably provided and electrically associated with a corresponding respective backlight (preferably an LED, not depicted) for illuminating a respective key. A slave microcontroller 130 is preferably operatively interconnected between the microprocessor 102 and each backlight for individually illuminating each backlight in accordance with signals generated by the microprocessor 102 in further accord with the program code 106 in a manner described in further detail below. Alternatively, the microprocessor 102 may, either by itself or in conjunction with a display driver integrated circuit (not shown), control the illumination of the backlights, thereby foregoing the need for the microcontroller 130. In yet another alternate embodiment, only backlights associated with the 1, 2, 3, 4, 5, 6, 7, 8, 9, 0, *, and # keys may be individually illuminated. The present invention will be described herein with respect to control of illumination of the backlights by the microprocessor 102, it being understood, however, that the microcontroller 130 or a display driver integrated circuit may be used to effect such control.

In further accord with the present invention, the program code 106 includes logic for illuminating one or more of the backlights according to a pattern which corresponds to status information to be communicated from the communication device 100 to a user of the communication device. Such status information includes conventional information relating to status, such as signal strength, battery charge, phone number of an incoming call, and the like.

Figure 5:
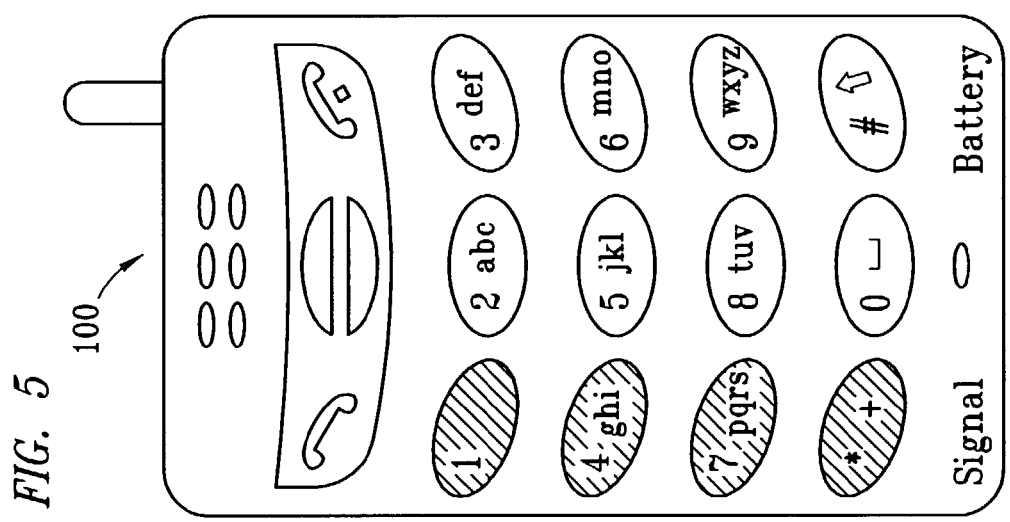

More specifically, in the operation of a preferred embodiment of the present invention, any one of five levels of signal strength are indicated by illuminating none or up to four backlights corresponding to the *, 7, 4, and 1 keys. If no signal or negligible signal is detected, then no backlights are illuminated. Weak signal strength, that is less than one-fourth of full signal strength, is indicated by illuminating the backlight associated only with the * key, as depicted by FIG. 2. One-fourth to one-half of full signal strength is indicated by illuminating backlights associated with the * key and 7 key, as depicted by FIG. 3. One-half to three-fourths of full signal strength is indicated by illuminating backlights associated with the * key, the 7 key, and the 4 key, as depicted by FIG. 4. Any signal strength that is greater three-fourths of full signal strength is indicated by illuminating backlights associated with the * key, the 7 key, the 4 key, and the 1 key, as depicted by FIG. 5. When more than one key is to be illuminated to indicate signal strength, the keys are preferably illuminated sequentially upwardly (as viewed in FIGS. 2–5), beginning with the * key, and then remain on for a predetermined period of time, such as ten seconds before again sequentially illuminating the backlights.

Figure 6:
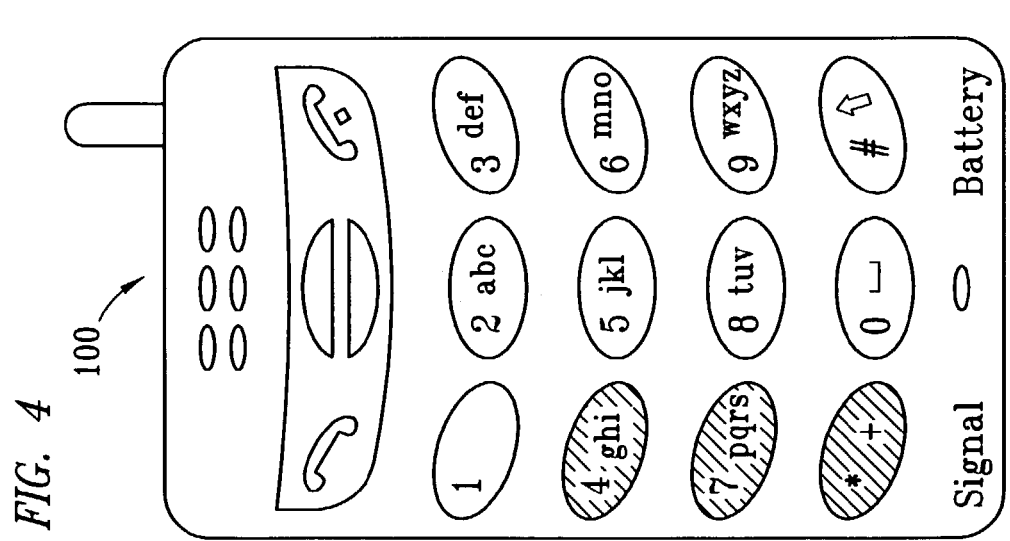

Similarly, any one of five levels of battery charge of the battery 112 are indicated by illuminating none or up to four backlights corresponding to the #, 9, 6, and 3 keys. If no battery charge or negligible battery charge is detected, then no backlights are illuminated. Weak battery charge, or less than one-fourth of full battery charge, is indicated by illuminating the backlight associated only with the # key, as depicted by FIG. 6. One-fourth to one-half of full battery charge is indicated by illuminating backlights associated with the # key and 9 key, as depicted by FIG. 7. One-half to three-fourths of full signal strength is indicated by illuminating backlights associated with the # key, the 9 key, and the 6 key, as depicted by FIG. 8. Any signal strength that is greater three-fourths of full signal strength is indicated by illuminating backlights associated with the # key, the 9 key, the 6 key, and the 3 key, as depicted by FIG. 9. When more than one key is to be illuminated to indicate battery charge, the keys are preferably illuminated sequentially upwardly (as viewed in FIGS. 6–9), beginning with the # key, and then remain on for a predetermined period of time, such as ten seconds before again sequentially illuminating the backlights. If less than three minutes of battery charge remain for operation of the communication device 100, then the # key preferably flashes intermittently for a period of time, such as three or four seconds, after which all the backlights are preferably illuminated to allow a user to view the entire interface. The # key may additionally be provided with a backlight of a different color from other backlights to further alert a user that battery charge is relatively low, or that less than three minutes of battery charge remain for operation of the communication device 100.

It is understood that the backlights described above with respect to signal strength and battery charge may be illuminated simultaneously to display the status of both signal strength and battery charge. For example, FIG. 10 shows one-half signal strength and three-fourths of battery charge via the illumination of backlights associated with the *, 7, #, 9, and 6 keys.

Figure 11:
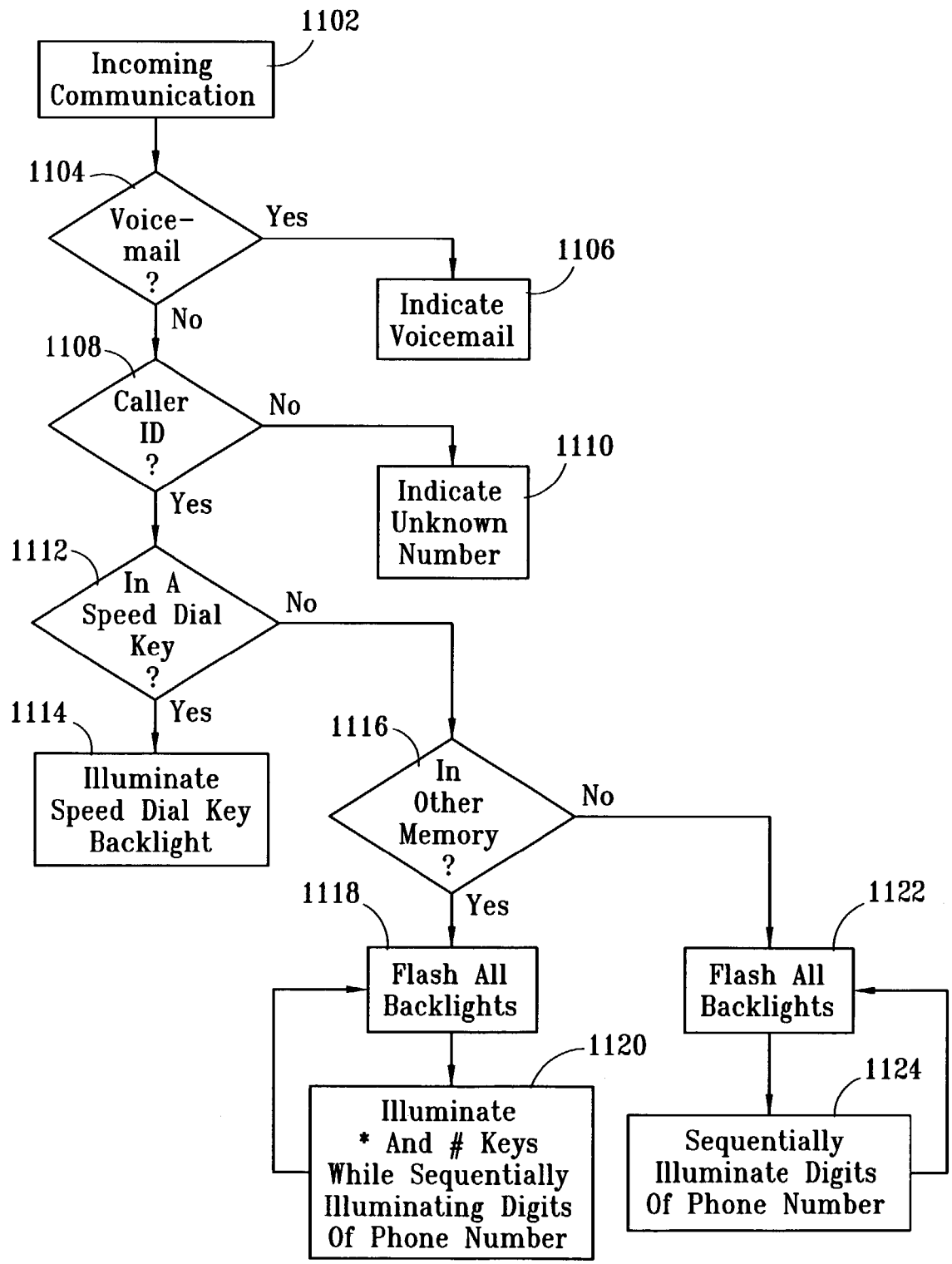
FIG. 11 shows a flow chart illustrating control logic embodying features of the present invention for indicating status.

FIG. 11 is a flow chart illustrating logic embodied by the program code 106 for handling incoming communications, as depicted by step 1102. In step 1104, a determination is made whether the incoming communication is a message indicating that there is voicemail in queue to be received by the communication device 100. If it is determined that the incoming communication is a message indicating that there is voicemail in queue, then execution proceeds to step 1106 in which one or more backlights are preferably illuminated according to a pattern that signifies voicemail. One such preferred pattern would be to illuminate the 1, 4, 7, 0, 9, 6, and 3 keys, as shown in FIG. 12, to thereby form a pattern resembling a "V" signifying voicemail.

If, in step 1104, it is determined that the incoming communication does not indicate that a voicemail message is in queue, then execution proceeds to step 1108 in which a determination is made whether the incoming communication includes a caller identification phone number ("caller ID"). If it is determined that the incoming communication does not include caller ID, then execution proceeds to step 1110 in which one or more backlights are preferably illuminated for a predetermined period of time, such as four seconds, according to a pattern that signifies an unknown number. For example, one such pattern may be to illuminate the 1, 2, 3, 6, 9, 8, and 0 keys, as shown in FIG. 13, to thereby form a pattern similar to a "?" (i.e., a question mark) signifying an unknown number.

Figure 14:
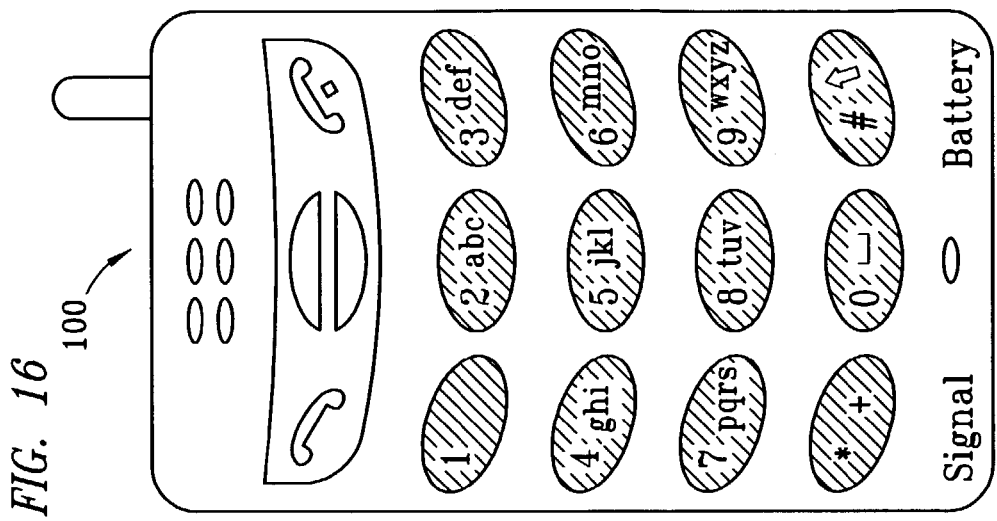
Figure 15:
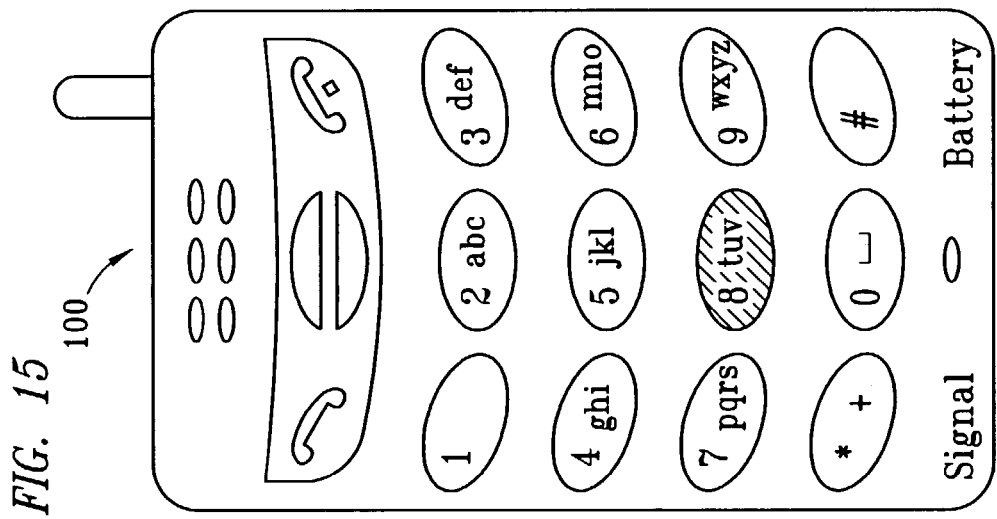

If, in step 1108, it is determined that the incoming communication does include caller ID, then execution proceeds to step 1112 in which a determination is made whether the caller ID matches a phone number stored in the data storage unit 104 for a speed dial key (i.e., a key programmed by the user to automatically dial a preset phone number when pressed). If it is determined that the caller ID matches a phone number stored in the data storage unit 104 for a speed dial key, then execution proceeds to step 1114 in which the respective speed dial key is illuminated for a predetermined period of time, such as four seconds, to indicate that a call is coming in from the number represented by the speed dial key. For example, if the caller ID matches the phone number represented by the speed dial key 4, then the backlight for the 4 key would be illuminated, as shown in FIG. 14, and preferably flashed intermittently. In another example, if the caller ID matches the phone number represented by the speed dial key 8, then the backlight for the 8 key would be illuminated, as shown in FIG. 15.

Figure 16:
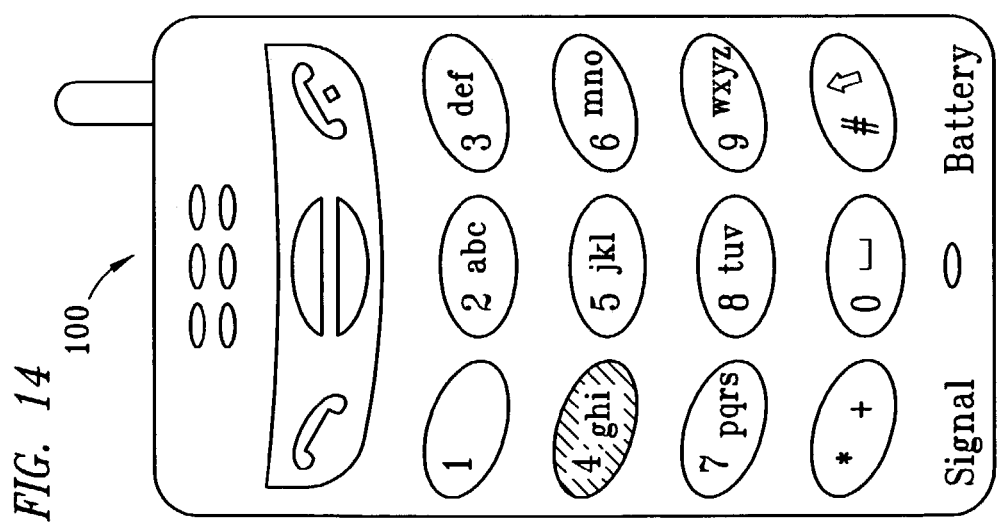
Figure 17:
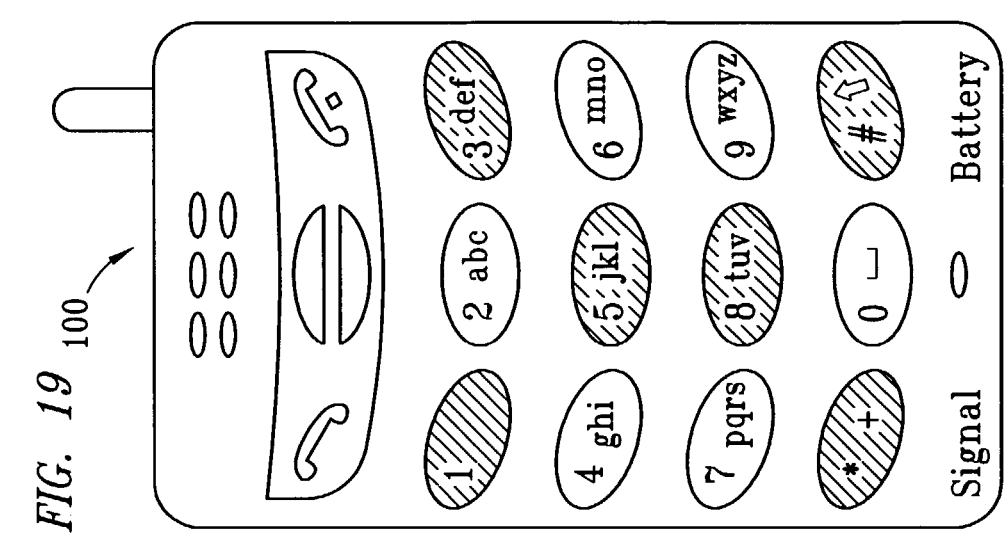

If, in step 1110, it is determined that the caller ID does not match a phone number stored in the data storage unit 104 for a speed dial key, then execution proceeds to step 1116 in which a determination is made whether the caller ID matches another number stored in the data storage unit, such as a previously dialed phone number, a previously called phone number, the caller ID of a previous call received, and/or the like. If it is determined that the caller ID matches another number stored in the data storage unit, then execution proceeds to step 1118 in which all backlights are preferably flashed on (or alternatively flashed off) for a fraction of a second (e.g., half of a second), as depicted in FIG. 16, and then the backlight of each key representing each digit of the caller ID phone number is preferably sequentially illuminated to communicate to the user the caller ID phone number of the incoming call, as exemplified in FIG. 17 with respect to a caller ID phone number (214) 536-9870. As also shown in FIG. 17, the * key and # key preferably continue to be illuminated or, alternatively, just one of the * key or # key may continue to be illuminated, to indicate that the caller ID number is one stored in the data storage unit. Execution then returns to step 1118, and steps 1118 and 1120 are repeated until the user picks up the incoming call, or until the loop defined by steps 1118 and 1120 are executed a predetermined number of times, such as five times, or until a caller terminates the call.

Figure 18:
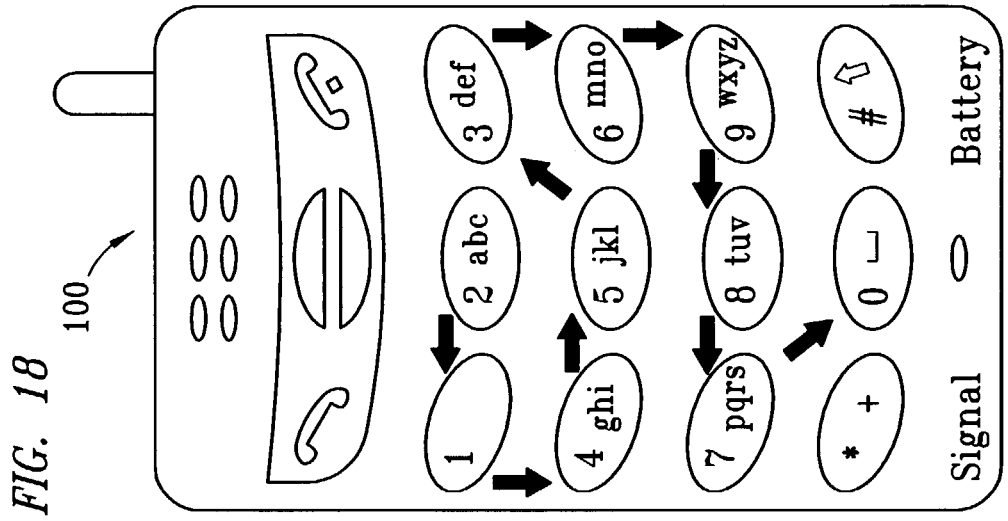

If, in step 1116, it is determined that the caller ID does not match another number stored in the data storage unit, then execution proceeds to step 1120 in which all backlights are preferably flashed on (or alternatively flashed off) for a fraction of a second (e.g., half of a second), as depicted in FIG. 16, and then the backlight of each key representing each digit of the caller ID phone number is preferably sequentially illuminated to communicate to the user the caller ID phone number of the incoming call, as exemplified in FIG. 18 with respect to a caller ID phone number (214) 536-9870. It is noted that, in accordance with FIG. 17, neither the * key not the # key are illuminated while the caller ID phone number is displayed, to there indicate that the caller ID phone number is not one stored in the data storage unit. Execution then returns to step 1122, and steps 1122 and 1124 are repeated until the user picks up the incoming call, or until the loop defined by steps 1122 and 1124 are executed a predetermined number of times, such as five times, or until a caller terminates the call.

Figure 19:
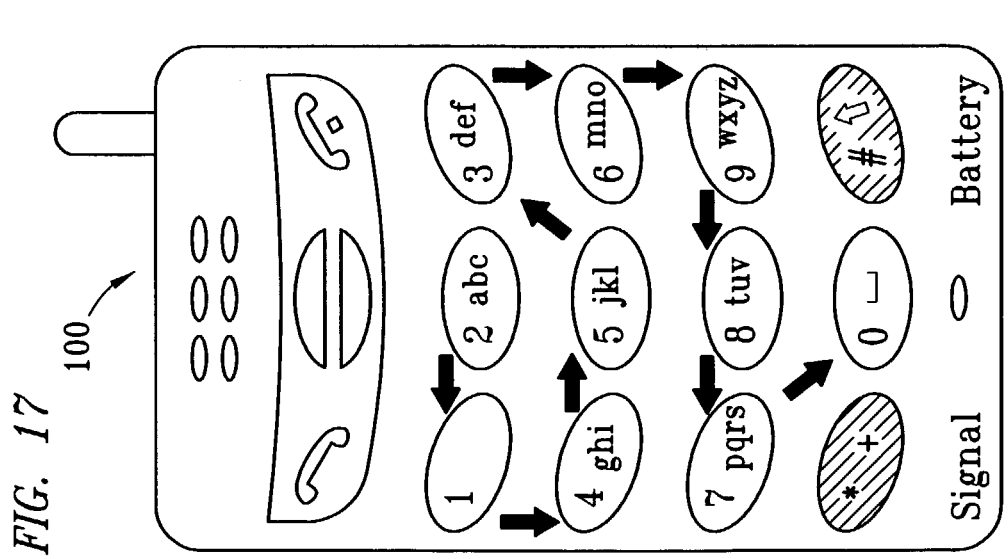
Figure 20:
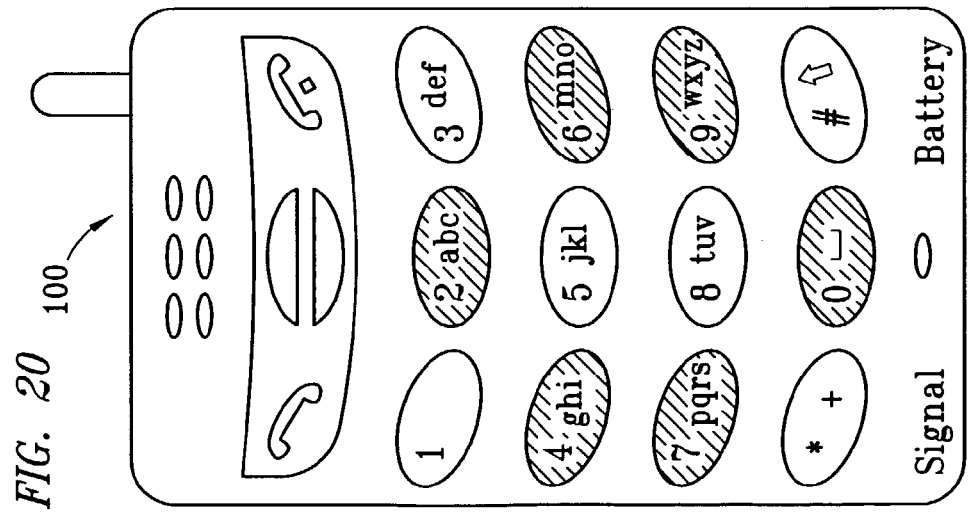

If a call is missed, then the backlights of the communication device 100 would preferably be flashed intermittently between two complementary patterns, such as the patterns depicted by FIGS. 19 and 20. It is understood that, alternatively, a number of different backlight patterns may be flashed intermittently, or a static display, rather than a sequential display, of the backlights may be illuminated to indicate a missed call.

Figure 22:
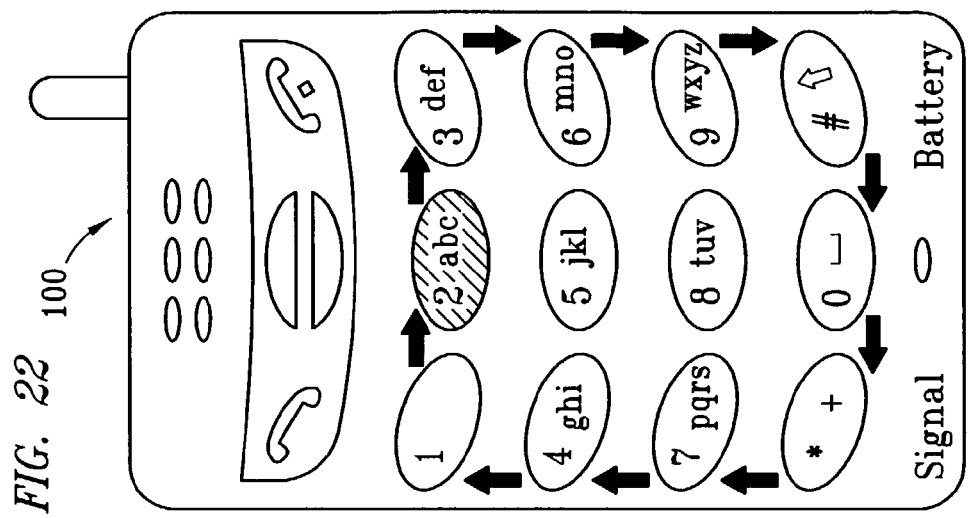
Figure 21:
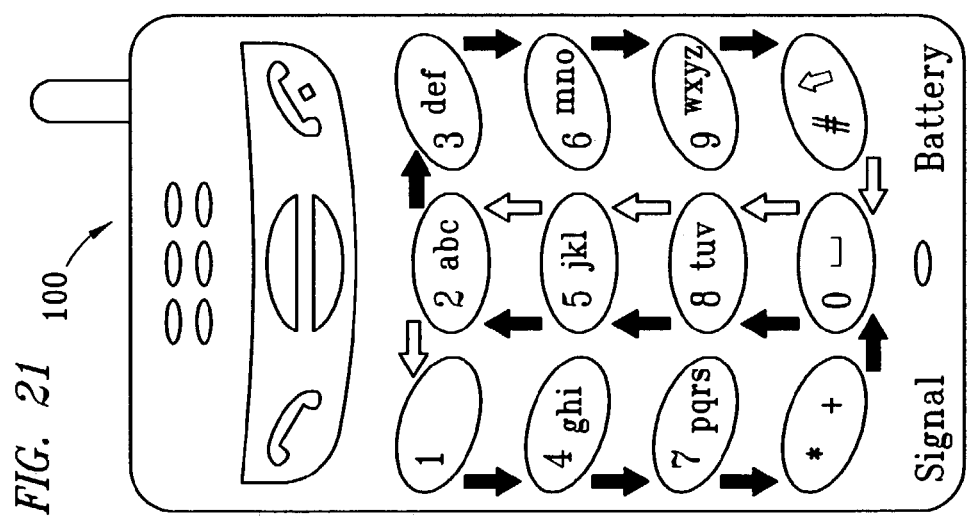

FIG. 21 depicts a sequence in which backlights may be illuminated to indicate that the communication device 100 is in a roaming mode. It is understood that there may be any number of different sequences in which the backlights may be illuminated to indicate a roaming mode, one such alternative being depicted in FIG. 22. In a further alternative embodiment, a static display, rather than a sequential display, of the backlights may be illuminated to indicate a roaming mode.

Figure 23:
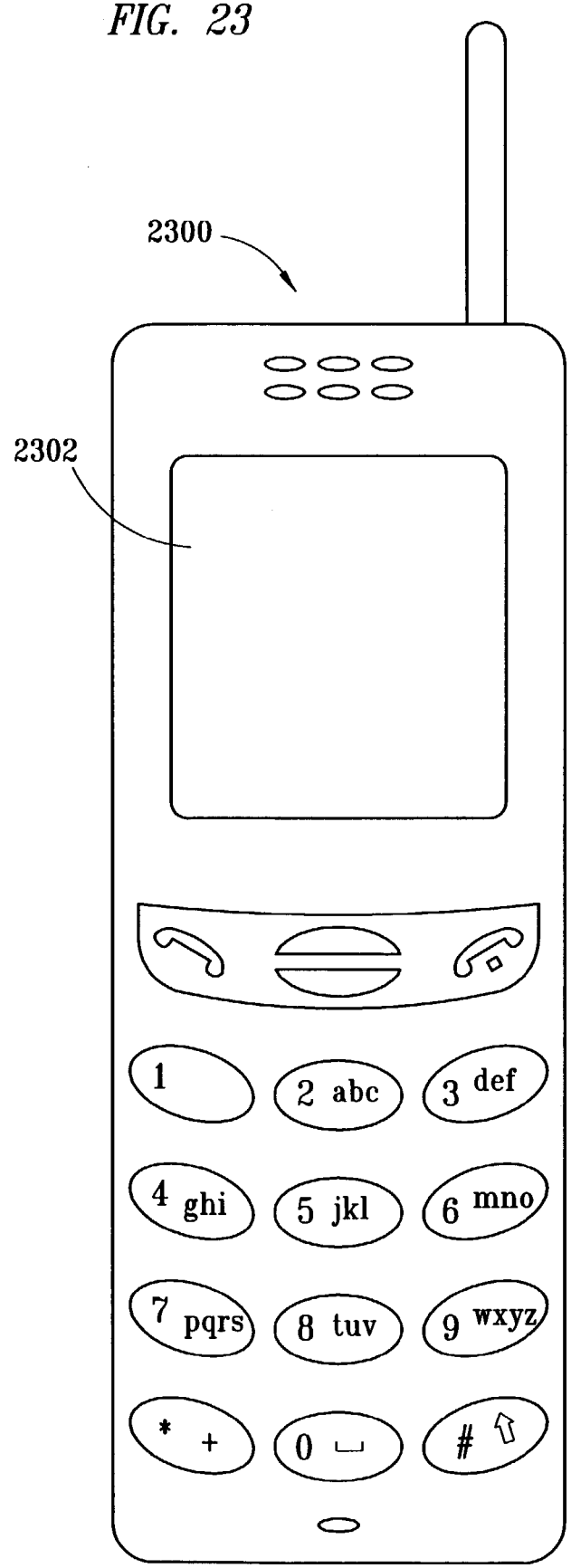
FIG. 23 shows an alternate embodiment of the communication device of FIG. 1, embodying features of the present invention.

FIG. 23 illustrates an alternate embodiment of the present invention, in which a communication device 2300 similar to the communication device 100, is further provided with a conventional visual graphical display 2302 in which some or all of the aforementioned status information may be visually displayed. A visual graphical display such as the display 2302 is considered to be well-known and will, therefore, not be described in further detail herein.

It is understood that the present invention may take many forms and embodiments. Accordingly, several variations may be made in the foregoing without departing from the spirit or the scope of the invention. For example, any number of different backlight patterns may be utilized to convey various status information. The Talk key 122 and End key 124 may be illuminated during caller ID events, such as depicted by FIGS. 14–18, to assist a user in answering or rejecting a call. If any status changes, a unique pattern (such as all backlights flashing intermittently) may be utilized to draw the attention of the user to the communication device 100. Audio (e.g., sound or artificial voice) and vibrational indications may also be used in combination with varying backlight patterns to indicate status of, get the attention of, or alert, a user of significant status or a change in status.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for indicating status on a programmed communication device comprising the steps of:
   associating each of one or more backlights with a respective key of a plurality of keys;
   generating status information to be communicated to a user of said communication device;
   illuminating one or more backlights according to a pattern corresponding to said status information;
   determining, in response to receipt of an incoming call, whether said incoming call does not include a caller identification phone number; and generating to a microprocessor of said communication device, in response to a determination that said incoming call does not include a caller identification phone number, status information indicating that said incoming call does not include a caller identification phone number; and
   wherein said pattern corresponding to said status information comprises a shape resembling a question mark.

2. A communication device user interface comprising:
   a plurality of keys operably integrated into said communication device;
   a plurality of backlights each of which backlights is associated with respective one key of said plurality of keys;
   a microprocessor operatively connected for illuminating one or more backlights: a data storage unit operatively connected to said microprocessor for storing program code executable by said microprocessor; and
   program code executable by said microprocessor for illuminating one or more backlights according to a pattern corresponding to status information to be communicated to a user of said communication device;
   program code, responsive to receipt of an incoming call, for determining whether said incoming call does not include a caller identification phone number; and
   program code, responsive to a determination that said incoming call does not include a caller identification phone number, for generating to said microprocessor status information indicating that said incoming call does not include a caller identification phone number and wherein said pattern corresponding to said status information comprises a shape resembling a question mark.

* * * * *